US005873978A

United States Patent [19]

Kuroyama et al.

[11] Patent Number: 5,873,978

[45] Date of Patent: Feb. 23, 1999

[54] RECORDING PAPER

[75] Inventors: Yoshihiro Kuroyama; Yoichi Yamazaki; Yasunori Nanri, all of Tokyo, Japan

[73] Assignee: Nippon Paper Industries Co., Ltd., Tokyo, Japan

[21] Appl. No.: 808,437

[22] Filed: Feb. 28, 1997

[30] Foreign Application Priority Data

Mar. 1, 1996 [JP] Japan .................................... 8-068919

[51] Int. Cl.[6] ............................... D21F 11/00; B32B 3/00

[52] U.S. Cl. .......................... 162/135; 162/175; 162/177; 162/178; 162/181.1; 428/211; 428/537.5; 428/340; 428/341

[58] Field of Search ................................ 162/135, 181.1, 162/181.8, 175, 177, 178, 158, 164.1; 428/211, 195, 535, 537.5, 537.1, 340, 341, 342; 346/135.1, 136

[56] References Cited

U.S. PATENT DOCUMENTS

| | | | |
|---|---|---|---|
| 4,496,629 | 1/1985 | Haruta et al. | 428/341 |
| 4,956,223 | 9/1990 | Arai et al. | 428/212 |
| 5,180,624 | 1/1993 | Kojima et al. | 428/211 |
| 5,541,002 | 7/1996 | Hosoi et al. | 428/537.5 |

FOREIGN PATENT DOCUMENTS

| | | |
|---|---|---|
| 0 180 396 | 5/1986 | European Pat. Off. . |
| 0 367 231 | 5/1990 | European Pat. Off. . |
| 2 620 655 | 3/1989 | France . |
| 30 16 766 | 11/1980 | Germany . |
| 2 050 866 | 1/1981 | United Kingdom . |

*Primary Examiner*—Stanley S. Silverman
*Assistant Examiner*—José S. Fortuna
*Attorney, Agent, or Firm*—Millen, White, Zelano, & Branigan, P.C.

[57] ABSTRACT

Provided is a recording paper having a feeling of plain paper suitable for ink jet recording with water-base ink, with the recording paper having in both machine and cross directions an irreversible shrinkage factor of from −0.10% to +0.10% when it is put under an environment that the relative humidity thereof is changed from 35% to 90% and further changed to 35%.

8 Claims, No Drawings

RECORDING PAPER

FIELD OF THE INVENTION

The present invention relates to a recording paper and, more particularly, to a recording paper having a feeling of plain paper which ensures high printing quality and, especially in the use as an ink jet recording paper, hardly causes curling and rippling problems after printing.

BACKGROUND OF THE INVENTION

In recent years, copying machines and printers using an electrophotographic or ink jet recording method have undergone remarkable improvements in performance. Specifically, they have made spectacular progress in not only copying and printing speeds but also image qualities, particularly in full-color copying and printing arts. However, recording apparatus, such as copying machines and printers of the aforementioned type, cannot fully achieve their excellent performances unless they match well with recording paper used therein.

In accordance with an ink jet recording method, the recording is generally carried out using water base ink, and so it has drawbacks of being inferior in drying speed of ink and suffering from ripple generation on the recording paper surface after printing.

For the recording paper applied to an ink jet recording system, therefore, it is required to have not only properties of ensuring high-speed drying of ink, providing recorded images of high optical density and causing neither overflowing nor feathering of ink but also a property of causing no ripple on the recording paper after absorption of ink. The generation of ripple and curl in an ink jet recording paper vary in their behaviors according to the ink absorption characteristics which the recording paper has, the surface tension and the permeability of ink used for the recording, the size of ink drops jetted, the amount of ink driven into the recording paper, the recorded area and so on. Further, their behaviors just after printing differ from those after spontaneous drying of the printed ink.

In order to reduce rippling and curling troubles occurring just after printing, various arts are disclosed. As for the ripples caused on the so-called pigment-coated ink jet recording paper, for instance, the method of preventing the ripple generation by the use of a raw paper having excellent dimensional stability is disclosed in Japanese Tokkai Sho 62-95285 (The term "Tokkai" as used herein means an "unexamined published patent application"). Further, Japanese Tokkai Hei 6-171206 pays special attention to a moisture change in the recording paper, and discloses the method of giving a particular treatment to the back side of a recording paper. Since the rippling and curling troubles occur due to expansion of paper upon recording, the point aimed at by both of those methods consists in securing the dimensional stability of a recording paper. In other words, the arts cited above intend the ripple generation problem to be solved by using a dimensionally stable paper and by giving a dimensional stability improving treatment to a recording paper, respectively.

As for the curl and ripple generation after spontaneous drying of printed ink, on the other hand, ink jet recording papers have not yet had substantial improvements therein. In a case where the undulation and the curling of a recording paper are smoothened out by half compulsion, e.g., with a decurler or the like, as disclosed in Japanese Tokkai Hei 7-186519, such distortion of the recording paper disappears seemingly, but the distortion still remains inside the recording paper. Accordingly, the distortion emerges into the paper surface when the recording paper is allowed to stand in such an environment as to change the moisture therein. Thus, such a half compulsory smoothening cannot dissolve the distortion in a substantial sense.

There are many reports on the curl of a general recording paper. In particular, the reversible curl have been analyzed in detail (e.g., in *Kami Pa Gikyo Shi*, Vol. 39, No. 10; ibid., Vol. 41, No. 4; ibid. , Vol. 43, No. 7). The reversible curl signifies the curl appearing in relatively high reproductivity when the environment of a recording paper is repeatedly changed in humidity, and the theoretical analysis thereof has been well in progress. As a result thereof, for instance, it has turned out that the so-called heat curl of an electrophotographic transfer paper, namely the curl after thermal fixation, can be controlled by restricting a paper's shrinkage factor to a specified range, wherein the shrinkage factor is defined as a shrinkage factor which the paper has on the last dehumidifying cycle when it undergoes three cycles of specified changes in environmental humidity to make reversible expansion and shrinkage cycles (Japanese Tokkai Hei 5-34155).

The irreversible curl, on the other hand, generates during the first cycle of changes in humidity, and the curl generating in the course of humidity change to the higher side is irreversible in particular. Far from being well analyzed, it is the present condition that the irreversible curl is hardly recognized yet.

SUMMARY OF THE INVENTION

Therefore, an object of the present invention is to provide a recording paper which not only ensures high quality in the images recorded thereon but also hardly generates ripples and curls after ink jet recording with water base ink.

The above-described object is attained by a recording paper having an irreversible shrinkage factor of from −0.10% to +0.10% in both the machine direction (or the traveling direction of paper in a paper machine) and the cross direction (or the direction crossing with the machine direction at right angles) when it is put under an environment that the relative humidity thereof is changed from 35% to 90% and further changed to 35%.

DETAILED DESCRIPTION OF THE INVENTION

The pulp used in the present recording paper can be selected properly from those generally used in paper making, such as hardwood- or softwood-made chemical pulp, mechanical pulp and deinked pulp. The present recording paper can contain an internal filler. Such a filler is selected properly from generally used fillers, e.g., talc, kaolin, calcium carbonate, titanium dioxide, silica and organic pigments.

For the present recording paper, it is required to apply to a raw paper on at least one side thereof a coating color comprising a water-soluble or water-dispersible polymer as a main component in accordance with a usual size press coating method or the like.

As for the water-soluble or water-dispersible polymer usable therein, starch, polyvinyl alcohol, carboxymethyl cellulose, casein, a styrene/butadiene latex, an acrylic emulsion and a vinyl acetate emulsion are examples thereof.

To the foregoing coating color, various additives used for general coating colors, such as a pigment, a dispersing agent, a flowability modifier, an anti-foaming agent, a dye and a water retention agent, can be added.

For the present recording paper, it is desirable that the amount of a coating color applied be not greater than 5 $g/m^2$, preferably from 0.2 $g/m^2$ to 3 $g/m^2$. And the basis weight of the present recording paper is desirably from 50 to 100 $g/m^2$.

For the present recording paper, the irreversible shrinkage factor in the machine direction and that in the cross direction are both required to be from −0.10% to +0.10%, preferably from −0.08% to +0.08%, when the paper is put under an environment that the relative humidity thereof is changed from 35% to 90% and further changed to 35%.

When the irreversible shrinkage factor in at least either the machine or cross direction is below −0.10%, expansion occurs in the printed area; while shrinkage occurs in the printed area when the irreversible shrinkage factor in at least either direction is greater than +0.10%. In such cases, the difference in dimensional change between printed and non-printed areas is too great to be neglected; as a result, a rippling phenomenon is generally caused, although it depends upon the printed pattern.

Further, it is desirable in the present invention that, when the recording paper is divided into two layers almost evenly to prepare a front side layer and a back side layer, and these two layers are put under an environment where the relative humidity thereof is changed from 35% to 90% and further changed to 35%; the differences in irreversible shrinkage factors in the machine direction and the cross direction between the front side layer and the back side layer be both within the range of 0.00 to 0.05%, particularly preferably from 0.00 to 0.03%. When the difference in irreversible shrinkage factor between the front side and the back side of the recording paper is greater than 0.05%, curling tends to occur upon recording although it depends upon the surface tension of recording ink and the pattern recorded.

The irreversible shrinkage factors specified by the present invention can be attained, e.g., by controlling the drying condition in the paper-making process and properly choosing ingredients to constitute a paper stock in accordance with known methods. More specifically, the foregoing requirement for the irreversible shrinkage factors can be filled, e.g., by adjusting a draw in the paper-making process to the range of 102 to 104%, wherein the term "draw" is expressed in the percentage of a reel speed to a wire part speed.

By adjusting the draw to such an appropriate range as described above, not only the intended irreversible shrinkage factor can be obtained in the machine direction, but also the tension applied directly to the machine direction produces Poisson effect to result in the attainment of the intended irreversible shrinkage factor in the cross direction also.

The paper-making in the present invention can be carried out using a general paper machine, such as a Fourdrinier multicylinder paper machine or a twin-wire multicylinder paper machine.

For the purpose of controlling the paper made with such a general paper machine so as to have the irreversible shrinkage factors within the range specified by the present invention, as mentioned above, careful adjustment of the draw is required in particular, and it is further required to pay attention to an evaporation rate in the latter stage of drying.

As for the difference in irreversible shrinkage factors between the front and back sides of the recording paper, its control to the range specified by the present invention can be effected, e.g., by employing a multicylinder dryer in a general paper machine and performing the drying operation in the latter stage under an extremely gentle condition to minimize a drying difference between upper and lower parts.

Additionally, the division of the recording paper into two layers can be performed, e.g., by adopting the method of delaminating a paper by means of adhesive tape as described in Japanese Tokkai Hei 3-69694.

Any recording paper can serve the purpose of the present invention so long as it has the irreversible shrinkage factors in the machine direction and the cross direction, respectively, within the range of −0.10 to +0.10% when the relative humidity of the recording paper's environment is changed from 35% to 90% and further changed to 35%.

The recording paper according to the present invention enables high-speed full color printing when it is applied to an ink jet recording system, and hardly generates curls and ripples after drying the images printed thereon. In addition, the present recording paper can provide images of high quality when it is used as electrophotographic transfer paper.

The present invention will now be illustrated in more detail by reference to the following examples. However, the invention should not be construed as being limited to these examples. Unless otherwise noted, all "%" and all "parts" in the examples are by weight.

EXAMPLE 1

A paper stock containing 87 parts of LBKP with a freeness of 390 ml, 13 parts of precipitated calcium carbonate, 0.03 part of a sizing agent (alkylketene dimer type), 0.7 part of cationized starch, 0.2 part of paper strength reinforcing agent and 0.05 part of a retention aid was adjusted to a concentration of 0.03%, and used for paper-making. The paper-making was carried out using a Fourdrinier multicylinder paper machine under a condition that the wire part speed was adjusted to 550 m/min and the draw was adjusted to 102%. In the size press part of the paper machine, an aqueous coating color containing 5% of oxidized starch, 0.1% of a surface sizing agent (acrylic type) and 0.2% of a conductive agent was applied. The coating color applied was dried with a multicylinder dryer. The thus obtained recording paper had a feeling of plain paper, and the basis weight thereof was 64 $g/m^2$.

EXAMPLE 2

A recording paper having a feeling of plain paper was prepared in the same manner as in Example 1, except that LBKP having a freeness of 300 ml was used in the proportion of 95 parts, the proportion of precipitated calcium carbonate was changed to 5 parts and the draw was adjusted to 104%. The basis weight of the thus obtained recording paper was 64 $g/m^2$.

EXAMPLE 3

A recording paper was made from the same paper stock as used in Example 1 by the use of a twin-wire multicylinder paper machine under a condition that the wire part speed was adjusted to 600 m/min and the draw was adjusted to 103%. In the course of paper-making, an aqueous coating color containing 5% of oxidized starch, 0.1% of a surface sizing agent (acrylic type) and 0.2% of a conductive agent was applied in the size press part of paper machine, and the resultant paper was dried with a multicylinder dryer in the after-dryer part so as to have the moisture content of 3%. Further, the thus dried paper was humidified with a steam foil so as to have the moisture content of 5%, and then subjected to machine calendering. The recording paper thus obtained has a basis weight of 81 $g/m^2$.

COMPARATIVE EXAMPLE 1

A recording paper was prepared in the same manner as in Example 1, except that the draw was changed to 105% from 102%.

COMPARATIVE EXAMPLE 2

A recording paper having a feeling of plain paper was prepared from the same paper stock and the same aqueous coating color as used in Example 1 by the use of a Fourdrinier Yankee machine. Therein, the wire part speed was 550 m/min, the draw was adjusted to 104%, and the coating color applied in the size press part of the paper machine was dried with a Yankee dryer. The basis weight of the thus made recording paper was 64 $g/m^2$.

The recording papers prepared in the above Examples and Comparative Examples were each examined for the irreversible shrinkage factors under the following condition, and the extents of ripples and curls generated therein were each evaluated employing the following criteria. The results obtained are shown in Table 1.

(1) Determination of Irreversible Shrinkage Factors

The irreversible shrinkage factor in each of the machine direction and the cross direction was determined according to the method described in the paper written by T. Uesaka, C. Moss and Y. Nanri in *Journal of Pulp and Paper Science*, vol. 18, No. 1 (January 1992), entitled "The Characterization of Hygro-expansivity of Paper".

More specifically, a recording paper sample was placed in an environmental test room wherein the temperature and the humidity were controllable. The humidity in the room was changed continuously in the order of 50% RH→35% RH→90% RH→35% RH while the temperature was kept at 25° C. The resultant sample was examined for its length in each of the machine and cross directions and the moisture content therein by means of an extensometer having a moisture-content measurement function also. Additionally, the time of one cycle of humidity changes (35% RH→90% RH→35% RH) was adjusted to 6 hours. In each of the machine and cross directions, the irreversible shrinkage factor (%) of the paper was defined as $[(L_1-L_2)/L_0]\times100$, wherein $L_0$ represents the length of the paper having a moisture content of $M_0$ under the humidity set at the initial stage (50% RH), $L_1$ represents the length which the paper has at the time when, during the process of humidification (humidity change; 35% RH→90% RH), the moisture content in the paper comes to $M_0$ at the humidity of 50% RH, and $L_2$ represents the length which the paper has at the time when, during the process of dehumidification (humidity change; 90% RH→35% RH), the moisture content in the paper comes to $M_0$ at the humidity of 50%.

(2) Evaluation of Extents of Ripples and Curls

Printing was carried out on a recording paper sample so that a monochromatic solid area alternated with a blank area by the use of a color ink jet printer (BJC-400 J, trade name, a product of Canon Inc.), and dried spontaneously. The extents of ripples and curls generated in the resultant sample were each evaluated in three grades, ◎, ○ and X, arranged in order of superiority, by visual observation. The extents marked by ◎ and ○ are on satisfactory level.

TABLE 1

| | Irreversible shrinkage factor (%) in machine direction | Irreversible shrinkage factor (%) in cross direction | Difference between front and back sides in irreversible shrinkage factor in machine direction | Difference between front and back sides in irreversible shrinkage factor in cross direction | Extent of ripple generation | Extent of curl generation |
|---|---|---|---|---|---|---|
| Example 1 | 0.07 | 0.02 | 0.03 | 0.04 | ◎ | ○ |
| Example 2 | 0.09 | −0.02 | 0.03 | 0.03 | ○ | ◎ |
| Example 3 | 0.06 | 0.02 | 0.01 | 0.01 | ◎ | ◎ |
| Comparative Example 1 | 0.13 | −0.03 | 0.06 | 0.04 | X | X |
| Comparative Example 2 | 0.15 | 0.18 | 0.08 | 0.08 | X | X |

What is claimed is:

1. A recording paper comprising a raw paper and a coating color comprising a water-soluble or water-dispersible polymer applied on at least one side of the raw paper in an amount of 0.2 to 3 $g/m^2$, said recording paper having in both machine and cross directions an irreversible shrinkage factor of from −0.10% to +0.10% the irreversible shrinkage factor % being defined as $(L_1-L_2)/L_0\times100$ where $L_0$ is the length of the paper having moisture content $M_0$ under an initial 50% relative humidity, $L_1$ is the length of the paper at the time when, during humidification from 35% to 90% relative humidity, the moisture content comes to $M_0$ at 50% relative humidity and $L_2$ is the length of the paper at the time when, during dehumidification from 90% to 35% relative humidity, the moisture content in the paper comes to $M_0$ at 50% relative humidity.

2. A recording paper according to claim 1, which has a difference of from 0.00 to 0.05% between the front side and the back side in irreversible shrinkage factors in the machine direction and the cross direction respectively.

3. A recording paper according to claim 1, wherein said recording paper has a basis weight of from 50 to 100 $g/m^2$.

4. A recording paper according to claim 1, wherein the water-soluble or water dispersible polymer is a polymer selected from the group consisting of starch, polyvinyl alcohol, carboxymethyl cellulose, casein, a styrene/butadiene latex, an acrylic emulsion and a vinyl acetate emulsion.

5. A recording paper according to claim 1, which is made using a paper machine under a condition such that the draw expressed in the percentage of reel speed to wire part speed is in the range of 102% to 104%.

6. A recording paper according to claim 1, wherein preparation of the paper is conducted with a paper machine having a size press part and a dryer part and the coating color is applied in the size press part and drying is conducted with a multicylinder dryer in the dryer part.

7. A method of making a recording paper defined in claim 1, wherein a paper machine is used under a condition that the draw expressed in the percentage of a reel speed to a wire part speed is in the range of 102 to 104%.

8. A method of making a recording paper according to claim 7, wherein the coating color is applied in a size press part of the paper machine and dried with a multicylinder dryer.

* * * * *